United States Patent [19]

Harada

[11] Patent Number: 5,594,746
[45] Date of Patent: Jan. 14, 1997

[54] METHOD AND APPARATUS FOR FABRICATING FERROELECTRIC DOMAIN REVERSALS

[75] Inventor: Akinori Harada, Kanagawa-ken, Japan

[73] Assignee: Fuji Photo Film Co., Ltd., Kanagawa, Japan

[21] Appl. No.: 277,428

[22] Filed: Jul. 18, 1994

[30] Foreign Application Priority Data

Sep. 2, 1993 [JP] Japan .................. 5-218559

[51] Int. Cl.⁶ .................................. H01S 3/10
[52] U.S. Cl. .................................. 372/22; 359/245
[58] Field of Search .................. 372/22; 359/245, 359/254, 259, 260; 204/130, 164

[56] References Cited

U.S. PATENT DOCUMENTS 5,415,743  5/1995  Harada .................. 204/130

OTHER PUBLICATIONS

J. A. Armstrong et al, "Interactions Between Light Waves in a Nonlinear Dielectric", Physical Review, vol. 127, No. 6, Sep. 15, 1962, pp. 1918–1939.

Primary Examiner—Rodney B. Bovernick
Assistant Examiner—Robert E. Wise
Attorney, Agent, or Firm—Sughrue, Mion, Zinn, Macpeak & Seas

[57] ABSTRACT

An electrode is formed in a predetermined pattern on one surface of a unipolarized MgO-LiNbO₃ substrate that is a ferroelectric substance and possesses a non-linear optical effect. The substrate is subjected to corona electrical charging by the electrode and a corona wire disposed above another surface of the substrate which is opposite to the electrode-side surface, and hence an electric field is applied to the substrate. When localized domain reversals are created on areas where the electrode faces the substrate, a vessel is attached to the electrode-side surface of the substrate. While a resulting closed space is kept in a vacuum by a vacuum pump but the opposite-side surface of the substrate relative to the electrode-side surface is in a non-vacuum, an electric field is applied to the substrate.

4 Claims, 2 Drawing Sheets

METHOD AND APPARATUS FOR FABRICATING FERROELECTRIC DOMAIN REVERSALS

BACKGROUND OF THE INVENTION

1. Field of the Invention

This invention relates to an optical wavelength converter element for converting a fundamental wave into a second harmonic wave and, more particularly, a method and apparatus for creating domain reversals in a predetermined pattern on a ferroelectric substance having a non-linear optical effect in order to fabricate an optical wavelength converter element possessing periodic domain reversals.

2. Description of the Prior Art

A proposal has already been made by Bleombergen et al. in Physics Review vol. 127, No. 6 in 1918 (1962), in which the wavelength of a fundamental wave is converted into a second harmonic wave using an optical wavelength converter element with regions (domains) where the spontaneous polarization of a ferroelectric substance possessing a nonlinear optical effect is periodically inverted.

In this method, the fundamental wave can be phase matched with the second harmonic wave by setting the period Λ of the domain reversals to be an integral multiple of a coherence length Λc which is given by $$\Lambda c = 2\pi / \{\beta(2\omega) - 2\beta(\omega)\} \quad (1)$$

where $\beta(2\omega)$ designates the propagation constant of the second harmonic wave, and $2\beta(\omega)$ represents the propagation constant of the fundamental wave. When wavelength conversion is effected using a bulk crystal made of a nonlinear optical material, a wavelength to be phase-matched is limited to a specific wavelength inherent to the crystal. However, in accordance with the above described method, phase matching can be efficiently carried out by selecting a period Λ which satisfies the condition (1) for an arbitrary wavelength.

One example of the known methods for creating such periodic domain reversals is disclosed in U.S. Pat. No. 5,415,743 (filed by the same applicant as the present invention), in which an electrode is formed in a predetermined pattern on one surface of a unipolarized ferroelectric substance having a non-linear optical effect, and the ferroelectric substance is subjected to corona electrical charging by the electrode and a corona wire disposed above another surface that is opposite to the electrode-side surface, so that an electric field is applied to the substrate. Thus, localized domain reversals are created at areas where the electrode faces the ferroelectric substance.

The method for creating ferroelectric domain reversals utilizing the corona electrical charging is superior in productivity when compared with a method in which electron beams are irradiated in a predetermined pattern onto a ferroelectric substance. However, it is widely admitted that the method utilizing the corona electrical charging is inferior in evenness in the thickness-wise direction of the domain reversals and reproducibility.

In order to improve the evenness in the thickness-wise direction of the domain reversals and the reproducibility, as described in the foregoing U.S. Pat. No. 5,415,743 it has already been put forward that an electric field is applied to a ferroelectric substance positioned in a vacuum. However, this conventional method is only applied to a case where an electric field is directly applied to a ferroelectric substance via electrodes which are formed on two opposite surfaces of the ferroelectric substance, but is not applied to a case where an electric field is applied to a ferroelectric substance utilizing corona electrical charging. In other words, it is impossible for the ferroelectric substance to be subjected to corona electrical charging in a vacuum, and hence it has been deemed that it is impossible to apply the application of an electric field in a vacuum to the method for creating domain reversals utilizing corona electrical charging in view of the underlying principle.

SUMMARY OF THE INVENTION

In view of the above observations, the primary object of the prevent invention is to provide a method for creating ferroelectric domain reversals that enables ferroelectric domain reversals to be created evenly in the depth-wise direction with superior reproducibility.

Another object of the present invention is to provide an apparatus that carries out the foregoing method.

To these ends, according to one aspect of the present invention, there is provided a method for creating ferroelectric domain reversals having the steps of:

forming an electrode in a predetermined pattern on one surface of a unipolarized ferroelectric substance possessing a non-linear optical effect; and subjecting the ferroelectric substance to corona electrical charging by means of the electrode and a corona wire disposed above another surface of the ferroelectric substance which is opposite to the electrode-side surface, and applying an electric field to the ferroelectric substance, so that localized domain reversals are created on areas where the electrode faces the ferroelectric substance, the improvement comprising the step of:

applying an electric field to the ferroelectric substance while the electrode-side surface thereof is kept in a vacuum but the other surface thereof, which is opposite to the electrode-side surface, is in a non-vacuum.

According to a second aspect of the present invention, there is provided a method for creating ferroelectric domain reversals having the steps of:

forming an electrode in a predetermined pattern on one surface of a unipolarized ferroelectric substance possessing a non-linear optical effect; and subjecting the ferroelectric substance to corona electrical charging by the electrode and a corona wire disposed above another surface which is opposite to the electrode-side surface, and applying an electric field to the ferroelectric substance, so that localized domain reversals are created on areas where the electrode faces the ferroelectric substance, the improvement comprising the step of:

applying an electric field to the ferroelectric substance while the electrode-side surface thereof is kept in contact with insulating fluid but the other surface, which is opposite to the electrode-side surface, is not in contact with the insulating fluid.

According to a third aspect of the present invention, there is provided an apparatus for creating ferroelectric domain reversals comprising:

an electrode in a predetermined pattern formed on one surface of a unipolarized ferroelectric substance possessing a non-linear optical effect;

a corona wire disposed above another surface of the ferroelectric substance which is opposite to the electrode-side surface;

a power source which supplies a voltage to the ferroelectric substance via the electrode and the corona wire, so that the ferroelectric substance is subjected to corona electrical charging;

a means for constituting a closed space which includes the electrode-side surface as one surrounding wall when the means hermetically comes into contact with the periphery of the electrode-side surface of the ferroelectric substance; and an evacuating means for keeping the inside of the closed space in a vacuum.

According to a fourth aspect of the present invention, there is provided an apparatus for creating ferroelectric domain reversals comprising:

an electrode in a predetermined pattern formed on one surface of a unipolarized ferroelectric substance possessing a non-linear optical effect;

a corona wire disposed above another surface of the ferroelectric substance which is opposite to the electrode-side surface;

a power source which supplies a voltage to the ferroelectric substance via the electrode and the corona wire, so that the ferroelectric substance is subjected to corona electrical charging;

a means for constituting a closed space which includes the electrode-side surface as one surrounding wall when the means hermetically comes into contact with the periphery of the electrode-side surface of the ferroelectric substance; and insulating fluid which fills the closed space.

According to studies conducted by the inventor of the present invention, a drop in surface resistance of the ferroelectric substance and an uneven surface resistance due to the influence of moisture, or the like, in an ambient atmosphere, is one of several faction that contribute to the deterioration of evenness and reproducibility in the depth-wise direction of the domain reversals.

As can be seen from the method of the present invention, the surface of the ferroelectric substance, on which the electrode is formed and from which domain reversals start to extend when an electric field is applied, is kept in a vacuum. This prevents the deterioration of insulating properties between the electrodes caused by a drop in surface resistance of the ferroelectric substance and an uneven surface resistance due to the influence of moisture, or the like, in an ambient atmosphere. As a result of this, domain reversals on given pitches that are even in the horizontal and depth-wise directions can be created with superior reproducibility.

Moreover, in the second method of the present invention, the electrode-side surface of the ferroelectric substance is kept in contact with insulating fluid instead of being kept in a vacuum. In this case, as with the first method, the same is true for the second method with respect to the surface resistance of the ferroelectric substance and the insulating properties between the electrodes. Hence, domain reversals on given pitches that are even in the horizontal and depth-wise directions can be created with superior reproducibility.

In the previous method, as stated above, the electrode-side surface of the ferroelectric substance is kept in a vacuum or in contact with insulating fluid. However, the opposite surface of the ferroelectric substance relative to the electrode-side surface, that is, the surface above which the corona wire is disposed, is not in a vacuum and does not come into contact with insulating fluid. Therefore, the ferroelectric substance can be subjected to corona electrical charging in the usual manner utilizing the corona wire.

According to the first apparatus for creating domain reversals equipped with a means for constituting a closed space and an evacuating means for keeping the closed space in a vacuum, it is easy for this apparatus to keep only the electrode-side surface of the ferroelectric substance in a vacuum, and hence the first method of the present invention can be readily practiced.

Moreover, according to the second apparatus for creating domain reversals equipped with a means for constituting a closed space and an insulating fluid filling the closed space, it is easy for this apparatus to bring only the electrode-side surface of the ferroelectric substance into contact with the insulating fluid, and hence the second method of the present invention can be readily practiced.

DESCRIPTION OF THE PREFERRED EMBODIMENTS

With reference to the accompanying drawings, embodiments of the present invention will now be described in detail.

Figure 1A:
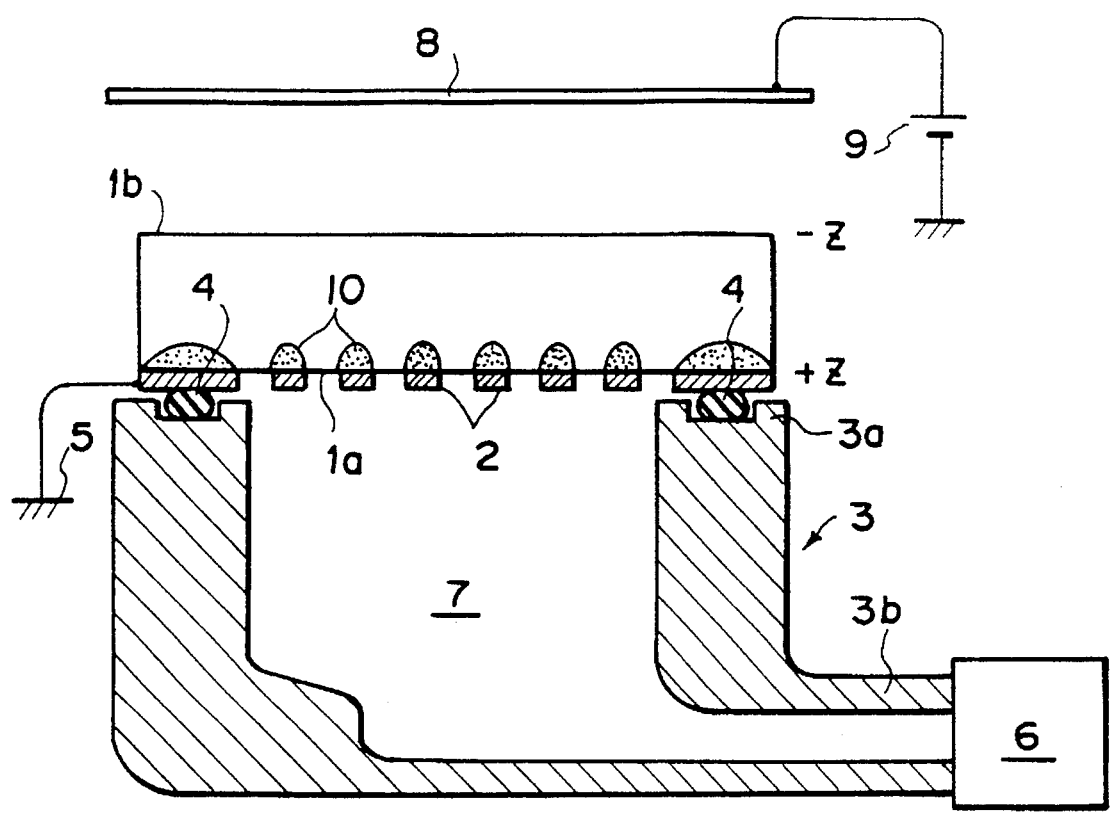
FIG. 1a and 1b are schematic representations showing how periodic domain reversals are created by a method according to a first embodiment of the present invention.
Figure 1B:
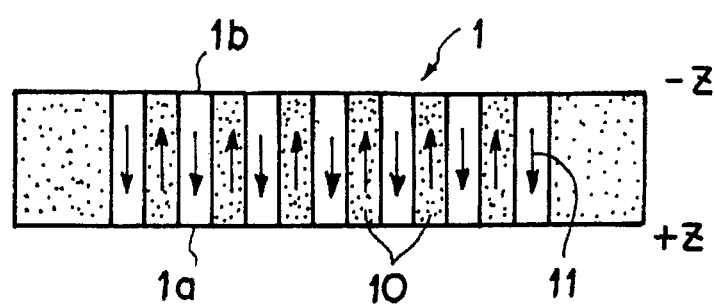

First Embodiment:

FIG. 1b shows how domain reversals are created on a ferroelectric substance according to a first embodiment of the present invention. In FIG. 1b, reference numeral 1 designates a MgO-LiNbO$_3$ substrate that is a ferroelectric substance possessing a non-linear optical effect. This substrate 1 is unipolarized and formed to a thickness of 0.5 mm. Also, z planes of this substrate are optically polished so that the largest non-linear optical constant $d_{33}$ can be effectively utilized. After a Ta thin film has been formed on the +z plane 1a of the substrate 1 by sputtering metal Ta on the same plane, a periodic electrode pattern 2 made of a Ta mask, as shown in FIG. 1a, is formed by photolithography and dry etching.

Subsequently, a surrounding wall 3a of a vessel 3 with its upper end, for example, squarely open is closely brought into contact with the periphery of the +z plane 1a of the substrate 1 (and in close proximity with the electrode 2 locate at the periphery). At this time, an O-ring 4 is interposed between the periphery of the +z plane 1a and the vessel's surrounding wall 3a, and they are hermetically attached to each other. Also, at this time, the +z plane 1a is grounded. The vessel 3 is provided with a small air vent pipe 3b connected to a vacuum pump 6. When the vessel 3 is attached to the +z plane 1a of the substrate 1, a closed space 7 is constituted in which the +z plane 1a serves as one surrounding wall of that space. The vacuum pump 6 is actuated, and the closed space 7 is maintained in a vacuum. A degree of vacuum at this time is set to, for example, not more than $1 \times 10^{-5}$ Torr.

In this state, an electric field is applied to the substrate 1 by corona electrical charging with the use of a corona wire 8 disposed above a −z plane 1b of the substrate 1 and a high voltage power source 9 connected to the corona wire. In this instance, the temperature of the substrate 1 is set to the range from room temperature to 300° C., and a distance between the corona wire 8 and the substrate 1 is set to 10 mm. Also, a voltage of, for example, −5 kV is applied to the substrate 1 for thirty seconds from the high voltage power source 9 via the corona wire 8.

After the substrate 1 is cut along the y plane thereof, it is subjected to selective etching by the use of an etchant composed of a mixture of a hydrofluoric acid (HF) and a nitric acid ($HNO_3$). When the cross section of the substrate 1 (along the y plane) was observed, it was ascertained that all periodic domain reversals 10 evenly extended from the −z plane to the +z plane on pitches corresponding to the electrode pattern 2 at locations where the periodic electrode pattern 2 is formed. These domain reversals 10 were geometrically even in the y plane and were created with superior reproducibility. In FIG. 1$b$, an arrow 11 designates a direction of polarization.

An optical wavelength converter element in which domain reversals are created will now be described.

Figure 2:
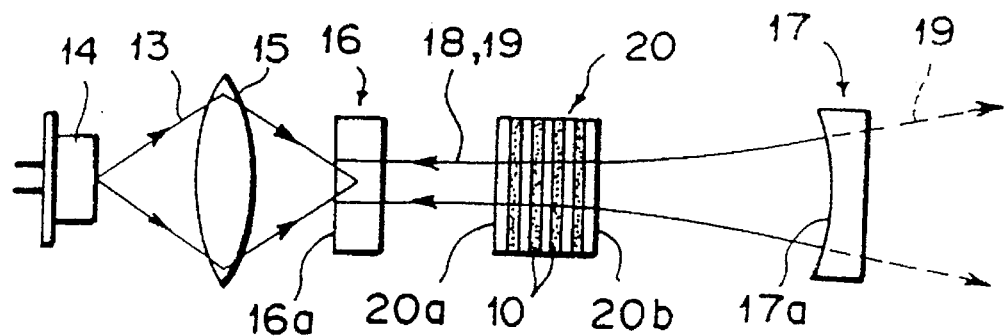
FIG. 2 is a schematic side elevation view showing when a bulk crystal type optical wavelength converter element, which has domain reversals created by the method of the present invention, is in use.

In the manner as set forth above, the periodic domain reversals 10 arranged in the direction of the x axis of the substrate 1 are created, and the x and −x planes of the substrate are polished. These planes are respectively coated with a non-reflective coating, so that they become light transmission planes 20$a$ and 20$b$. Thus, there is obtained a bulk crystal type optical wavelength converter element 20 as shown in FIG. 2. The bulk crystal type optical wavelength converter element 20 having the periodic domain reversals is disposed in a resonator of a laser-diode-pumped YAG laser shown in the drawing. To effect phase matching at a wavelength of 946 nm, a pitch Λ of the electrode pattern 2 was set to a first order period at a wavelength of 4.7 μm in the direction of the x axis of the substrate 1 allowing for the wavelength dispersion of a refractive index of MgO-$LiNbO_3$, and a crystal length was set to 1 mm.

This laser-diode-pumped YAG laser is constituted of a laser diode 14 for emanating a laser beam 13 at a wavelength of 809 nm as a pumping beam; a condenser lens 15 for focusing the laser beam 43 which is in a diverging state; a YAG crystal 16 serving as a laser medium doped with Nd (neodymium) and disposed at a position onto which the laser beam 13 is focused; and a resonant mirror 17 disposed in front of the YAG crystal 16 (on the right side in the drawing). An optical wavelength converter element 20 is interposed between the resonant mirror 17 and the YAG crystal 16.

The YAG crystal 16 is pumped by the laser beam 13 at a wavelength of 809 nm, and emanates a laser beam 18 at a wavelength of 946 nm. This solid-state laser beam 18 oscillates between an end surface 16a of the YAG crystal which is covered with a given coating and a mirror surface 17$a$ of the resonant mirror 17, and the beam is incident on the optical wavelength converter element 20, as a result of which the beam is converted to a second harmonic wave 19 at a half wavelength, that is, at 473 nm. The solid-state laser beam 18 serving as the fundamental beam and the second harmonic wave 19 are phase-matched (i.e. quasi-phase-matched) with each other in the periodic domain reversals, and only this second harmonic wave 19 substantially exits from the resonant mirror 17.

In this embodiment, when an output of the laser diode 14 was 200 mW, the second harmonic wave 19 having an output of 10 mW was obtained. The domain reversals 10 were geometrically even in both the horizontal and depth-wise directions, and hence the above-mentioned high output was obtained even when a light transmission area of the optical wavelength converter element 20 was arbitrarily set. Contrary to this, when a bulk crystal type optical wavelength converter element in which the domain reversals are created in the same manner as in the previous embodiment, except that the +z plane 1$a$ of the substrate 1 is not kept in a vacuum, the efficiency of the conversion of an optical wavelength is significantly dependent on the setting of the light transmission area of the optical wavelength converter element, because the geometry of the domain reversals is uneven. For this reason, the maximum output of the second harmonic wave was as low as 3 mW when the output of the laser diode 14 was set to the same level as mentioned above.

From the fact that such a high wavelength conversion efficiency was obtained, it is supported that domain reversals can be evenly created in both the horizontal and depth-wise directions.

Figure 3:
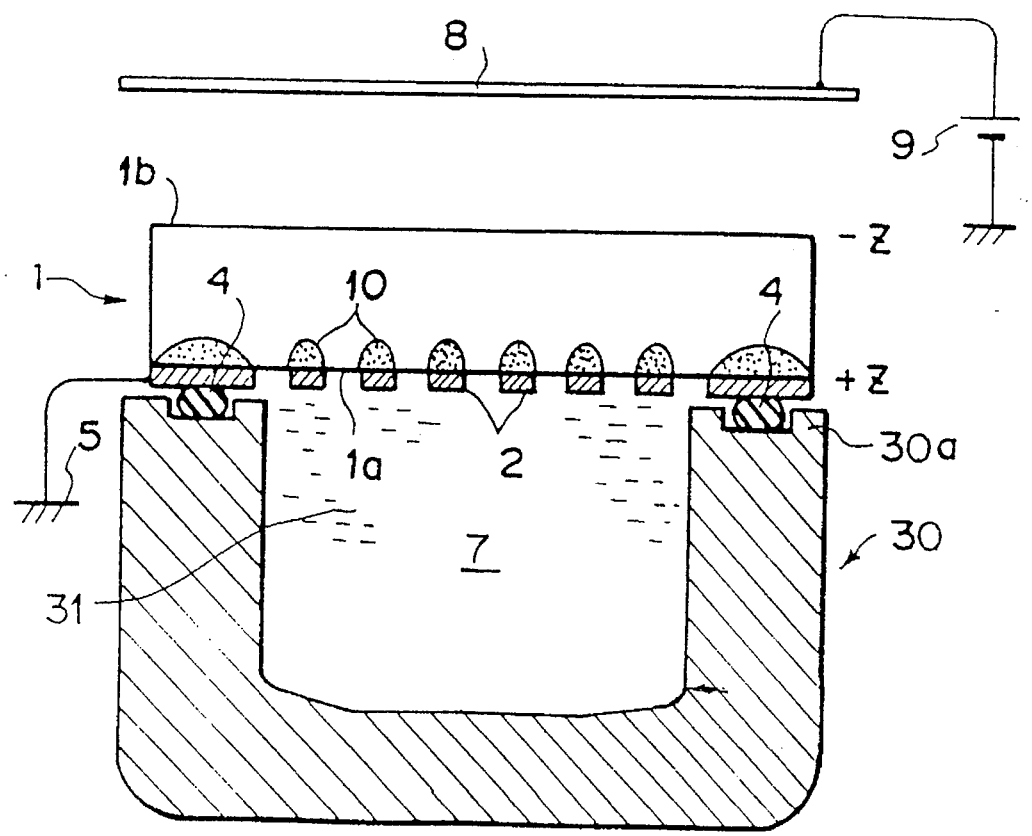
FIG. 3 is a schematic representation showing how periodic domain reversals are created by another method according to a second embodiment of the present invention.

Second Embodiment:

With reference to FIG. 3, a second embodiment of the present invention will now be described. In FIG. 3, the same reference numerals are provided to designate elements corresponding to those shown in FIG. 1, and the explanation thereof will be omitted here for brevity.

In the second embodiment, a vessel 30 having a surrounding wall 30$a$ similar to the surrounding wall 3$a$ of the vessel 3 used in the first embodiment is attached to the +z plane 1$a$ of the substrate 1. This vessel is integrated with the substrate 1 by means of a non-illustrated retainer, and the vessel 30 is filled with insulating oil 31. For this insulating oil 31, it is suitable to use synthetic insulating oils such as known alkylbenzene, polybutene, chlorinated synthetic oil, silicon oil and fluoro oil, or insulating oil prepared from petroleum. The integration of the vessel 30 with the substrate 1 is carried out while they are immersed in a bath containing the insulating oil 31. Thereby, the vessel 30 is completely filled with the insulating oil 31 without bubbles remaining in the vessel, and the +z plane 1$a$ of the substrate 1 on which the electrode pattern 2 is formed is entirely covered with the insulating oil 31.

In this state, in the same manner as in the first embodiment, an electric field is applied to the substrate 1 by corona electrical charging. At this time, the +z plane 1$a$ of the substrate 1 on which the electrode pattern 2 is formed is covered with the insulating oil 31. This prevents a surface resistance of the +z plane 1$a$ from dropping or becoming uneven because of moisture, or the like, in an ambient atmosphere, whereby the deterioration of the insulating characteristics of between the electrodes is prevented. Even in this embodiment, domain reversals on given pitches that are geometrically even in both the horizontal and depth-wise directions can be created with superior reproducibility.

Instead of the insulating oil 31, the use of other liquids having insulating properties or insulating gases will lead to similar effects and results. As such insulating gases, so-called negative gases that readily tend to become negative ions by attracting electrons and, more preferably, gases that molecularly contain halogen elements and readily tend to adsorb can be utilized. Specifically, carbon-fluoride-based gases (Freons such as $CCl_2F_3$) and $SF_6$, or the like, are mentioned.

The ferroelectric substance in which domain reversals are created according to the present invention is used as an element of a ring resonator by appropriately polishing and coating it. Thereby, the ferroelectric substance can be applied as an optical wavelength converter element of an external resonator type laser. Even in such a case, the same effects and results as obtained when the ferroelectric substance is applied to the laser-diode-pumped solid-state laser can be ensured. As a matter of course, a waveguide type optical converter element can be produced from the ferroelectric substance in which domain reversals are created according to the present invention.

It will be understood that the above description of the present invention is susceptible to various modifications, changes, and adaptations and that the same are intended to be comprehended within the meaning and range of equivalents of the appended claims.

What is claimed is:

1. A method for creating ferroelectric domain reversals comprising the steps of:

forming an electrode in a predetermined pattern on one surface of a unipolarized ferroelectric substance; and subjecting the ferroelectric substance to corona electric charging and applying an electric field to the ferroelectric substance by means of the electrode and a corona wire disposed above a surface of the ferroelectric substance opposite to the electrode-side surface, so that localized domain reversals are created on areas where the electrode faces the ferroelectric substance, wherein in applying an electric field to the ferroelectric substance, the electrode-side surface of said ferroelectric substance is in a vacuum while a surface of said ferroelectric substance opposite the electrode-side surface is in a non-vacuum.

2. A method for creating ferroelectric domain reversals comprising the steps of:

forming an electrode in a predetermined pattern on one surface of a unipolarized ferroelectric substance; and subjecting the ferroelectric substance to corona electrical charging and applying an electric field to the ferroelectric substance by the electrode and a corona wire disposed above a surface opposite to the electrode-side surface, so that localized domain reversals are created on areas where the electrode faces the ferroelectric substance, wherein in applying an electric field to the ferroelectric substance, the electrode-side surface of said ferroelectric substance is in contact with insulating fluid while a surface of said ferroelectric substance opposite the electrode-side surface is not in contact with the insulating fluid.

3. An apparatus for creating ferroelectric domain reversals comprising:

an electrode formed in a predetermined pattern on one surface of a unipolarized ferroelectric substance;

a corona wire disposed above a surface of the ferroelectric substance which is opposite to the electrode-side surface;

a power source which supplies a voltage to the ferroelectric substance via the electrode and the corona wire, so that the ferroelectric substance is subjected to corona electrical charging;

a means for constituting an enclosed space which comprises the electrode-side surface as one surrounding wall when the means comes into contact with the periphery of the electrode-side surface of the ferroelectric substance; and an evacuating means for keeping the inside of the enclosed space in a vacuum.

4. An apparatus for creating ferroelectric domain reversals comprising:

an electrode formed in a predetermined pattern on one surface of a unipolarized ferroelectric substance;

a corona wire disposed above a surface of the ferroelectric substance which is opposite to the electrode-side surface;

a power source which supplies a voltage to the ferroelectric substance via the electrode and the corona wire, so that the ferroelectric substance is subjected to corona electrical charging;

a means for constituting an enclosed space which comprises the electrode-side surface as one surrounding wall when the means comes into contact with the periphery of the electrode-side surface of the ferroelectric substance; and insulating fluid which fills the enclosed space.

\* \* \* \* \*